(12) United States Patent
Angell et al.

(10) Patent No.: US 6,702,672 B1
(45) Date of Patent: Mar. 9, 2004

(54) WIRELESS INTERACTIVE GAMING SYSTEM

(75) Inventors: Robert C. Angell, West Greenwich, RI (US); Mark W. Bowen, North Kingstown, RI (US)

(73) Assignee: GTECH Rhode Island Corporation, West Greenwich, RI (US)

( * ) Notice: Subject to any disclaimer, the term of this patent is extended or adjusted under 35 U.S.C. 154(b) by 0 days.

(21) Appl. No.: 09/342,150

(22) Filed: Jun. 29, 1999

Related U.S. Application Data

(63) Continuation-in-part of application No. 08/844,794, filed on Apr. 22, 1997.

(51) Int. Cl.[7] .................................................. A63F 9/22
(52) U.S. Cl. .............................. 463/25; 463/39; 463/42; 463/29; 705/39
(58) Field of Search .................................. 463/1, 12–13, 463/16–20, 25–31, 36, 39–42, 46–47; 700/91–93; 235/375, 380; 273/138.1, 138.2, 139, 143 R, 148 B, 269, 274, 292–293; 705/1, 14, 16–18, 39

(56) References Cited

U.S. PATENT DOCUMENTS

| | | | |
|---|---|---|---|
| 3,909,002 A | 9/1975 | Levy | 273/138 A |
| 4,455,025 A | 6/1984 | Itkis | 273/237 |
| 4,572,509 A | 2/1986 | Sitrick | 273/85 |
| 4,592,546 A | 6/1986 | Fascenda et al. | 273/1 E |
| 4,614,342 A | 9/1986 | Takashima | 273/85 |
| 4,624,462 A | 11/1986 | Itkis | 273/237 |
| 4,652,998 A | 3/1987 | Koza et al. | 364/412 |
| 4,747,600 A | 5/1988 | Richardson | 273/269 |
| 4,764,666 A | 8/1988 | Bergeron | 235/380 |
| 4,799,683 A | 1/1989 | Bruner, Jr. | 273/138 A |
| 4,815,741 A | 3/1989 | Small | 273/138 A |
| 4,848,771 A | 7/1989 | Richardson | 273/237 |
| 4,856,787 A | 8/1989 | Itkis | 273/237 |
| 4,937,853 A | 6/1990 | Brule et al. | 379/96 |
| 5,007,649 A | 4/1991 | Richardson | 273/237 |
| 5,043,887 A | 8/1991 | Richardson | 364/410 |
| 5,048,831 A | 9/1991 | Sides | 273/85 G |
| 5,072,381 A | 12/1991 | Richardson et al. | 364/410 |
| 5,083,272 A | 1/1992 | Walker et al. | 364/412 |
| 5,083,800 A | 1/1992 | Lockton | 273/439 |
| 5,159,549 A | 10/1992 | Hallman, Jr. | 364/412 |
| 5,242,163 A | 9/1993 | Fulton | 273/85 |
| 5,265,874 A | 11/1993 | Dickinson et al. | 273/138 |
| 5,276,312 A | 1/1994 | McCarthy | 235/380 |
| 5,326,104 A | 7/1994 | Pease et al. | 273/138 A |
| 5,343,239 A | 8/1994 | Lappington et al. | 348/12 |

(List continued on next page.)

FOREIGN PATENT DOCUMENTS

| | | |
|---|---|---|
| EP | 0307925 | 3/1989 |
| EP | 0 649 102 A3 | 4/1995 |
| EP | 0843272 | 5/1998 |
| WO | WO 96/00950 | 1/1996 |
| WO | WO 97/01145 | 1/1997 |
| WO | WO 97/05557 | 2/1997 |

OTHER PUBLICATIONS

European Search Report dated Jun. 6, 2000.

*Primary Examiner*—Mark A Sager
(74) *Attorney, Agent, or Firm*—Kenyon & Kenyon (57) ABSTRACT

A system and method for playing a wagering game uses a wireless gaming device including an identification code, entry apparatus for entering wagering information by a player, and a transmitter. A receiver receives the identification code and the wagering information transmitted by the transmitter of the wireless gaming device. The receiver polls the wireless gaming device to determine whether the player has entered wagering information to be transmitted to the receiver.

35 Claims, 8 Drawing Sheets

U.S. PATENT DOCUMENTS

| | | | |
|---|---|---|---|
| 5,351,970 A | 10/1994 | Fioretti | 273/439 |
| 5,429,361 A | 7/1995 | Raven et al. | 273/138 A |
| 5,519,433 A | 5/1996 | Lappington et al. | 348/2 |
| 5,526,035 A | 6/1996 | Lappington et al. | 348/13 |
| 5,538,255 A | 7/1996 | Barker | 463/41 |
| 5,561,419 A | 10/1996 | Sasaki et al. | 340/825.08 |
| 5,569,083 A | 10/1996 | Fioretti | 463/19 |
| 5,570,885 A | 11/1996 | Ornstein | 463/27 |
| 5,573,244 A | 11/1996 | Mindes | 463/26 |
| 5,575,474 A | 11/1996 | Rossides | 463/26 |
| 5,586,937 A | 12/1996 | Menashe | 463/41 |
| 5,613,912 A | 3/1997 | Slater | 463/25 |
| 5,618,045 A | 4/1997 | Kagan et al. | 463/40 |
| 5,638,113 A | 6/1997 | Lappington et al. | 348/12 |
| 5,643,088 A | 7/1997 | Vaughn et al. | 463/40 |
| 5,685,775 A | 11/1997 | Bakoglu et al. | 463/41 |
| 5,688,174 A | 11/1997 | Kennedy | 463/37 |
| 5,695,400 A | 12/1997 | Fennell, Jr. et al. | 463/42 |
| 5,702,305 A | 12/1997 | Norman et al. | 463/42 |
| 5,735,742 A | 4/1998 | French | 463/25 |
| 5,752,882 A | 5/1998 | Acres et al. | 463/25 |
| 5,770,533 A | 6/1998 | Franchi | 463/42 |
| 5,842,921 A | 12/1998 | Mindes et al. | 463/16 |

| ENTITY | ACTION | IMPACT |
|---|---|---|
| PLAYER | WIN GAME | CREDIT PLAYER'S ACCOUNT |
| PLAYER | PLACE WAGER | DEBIT PLAYER'S ACCOUNT |
| OFFICIANT | ACCEPT CASH FROM PLAYER | CREDIT PLAYER'S ACCOUNT |
| OFFICIANT | DISBURSE CASH TO PLAYER | DEBIT PLAYER'S ACCOUNT |

WIRELESS INTERACTIVE GAMING SYSTEM

This is a continuation-in-part of application Ser. No. 08/844,794, filed Apr. 22, 1997.

BACKGROUND OF THE INVENTION

This invention relates to an interactive gaming system, and in particular, a system which is operated by a wireless gaming device.

A typical casino-type game involves making a wager that a particular gaming event will occur, e.g., that a particular element from a set of numbers will be selected. In such a game, the payout or monetary prize awarded to a winning player usually depends on the amount of the player's wager and the probability that the event will occur.

Various games have been developed that require or permit interaction between the game and the game's players in a gaming or casino environment. Such interaction should be simple and uninhibited from the players' point of view, and cost effective for the gaming establishment. Since wagers and prizes can reach up to hundreds of thousands of dollars for many casino-type wagering games, players must have confidence in the integrity and reliability of such an interactive gaming system.

SUMMARY OF THE INVENTION

In general, in one aspect, the invention features a system for playing a wagering game. A wireless gaming device includes an identification code, entry apparatus for entering wagering information by a player, and a transmitter. A receiver receives the identification code and the wagering information transmitted by the transmitter of the wireless gaming device. The receiver polls the wireless gaming device to determine whether the player has entered wagering information to be transmitted to the receiver.

Implementations of the invention may also include one or more of the following features. The receiver may periodically poll the wireless gaming device. The wagering information may relate to a wager request, or may include a command or data. The wagering information may include a string of characters, which may be hexademical digits. The transmission may be by radio frequency signals or infrared signals.

The wireless gaming device may be a hand-held device. The entry apparatus may include keys or a smart card reader. The wireless gaming device may also include a wager amount register and an account balance register.

The wireless gaming device may include a liquid crystal display. The wireless gaming device may include a bicolor light emitting diode to indicate separately that the wagering information has been entered by the player and that the wagering information has been transmitted by the transmitter.

The system may also include a processor in communication with the receiver for processing the wagering information transmitted by the wireless gaming device based on the identification code. The processor may include a database for storing an account of the player.

The wireless gaming device may include an electronically programmable read only memory for storing an identifier corresponding to the identification code. The system may include an encryption key to encrypt the identification code and the wagering information prior to transmission and to decrypt the identification code and the wagering information after being received by the receiver.

In general, in another aspect, the invention features a method of playing a wagering game using a wireless gaming device. The wireless gaming device includes an identification code, entry apparatus for entering wagering information by a player, and a transmitter. The wagering information is entered into the entry apparatus. The wireless gaming device is polled to determine whether the player has entered wagering information to be transmitted by the transmitter. The identification code and the wagering information are then transmitted.

Implementations of the invention may also include one or more of the following features. The wireless gaming device may be polled periodically. The wagering information may be displayed on the wireless gaming device. The identification code and the wagering information may be transmitted by radio frequency signals or infrared signals. The wagering information may be processed based on the identification code. The identification code and the wagering information may be encrypted prior to transmission.

In general, in another aspect, the invention features a wireless gaming device for transmitting wagering information to a receiver. A memory stores an identification code. Entry apparatus is used for entering the wagering information. A transmitter converts the identification code and the wagering information into a signal for wireless transmission to the receiver, the transmitter transmitting the signal when the receiver polls the wireless gaming device to determine that the wagering information has been entered.

Implementations of the invention may also include one or more of the following features. The wireless gaming device may be periodically polled by the receiver. The identification code may be stored in the memory in a digital format. The wireless gaming device may be a hand-held device. The entry apparatus may include keys or a smart card reader. The wireless transmission may be by radio frequency signals or infrared signals.

The interactive gaming system of the present invention has the advantage of providing players with a simple and straightforward way to place wagers in a gaming environment.

The interactive gaming system of the present invention has the additional advantage of allowing players to place wagers in a gaming environment using a wireless gaming device.

The interactive gaming system of the present invention has the additional advantage that players can obtain confirmations of wagers and prizes while they are playing the game.

The interactive gaming system of the present invention has the further advantage of providing a system in which the total cost of the components of the system is low. This advantage is particularly important where a large number of players must be able to interact with the same game. For example, for a typical lottery game, players may number in the tens to hundreds of thousands.

Other features and advantages of the invention will become apparent from the following detailed description, and from the claims.

DESCRIPTION OF THE PREFERRED EMBODIMENTS

Figure 1:
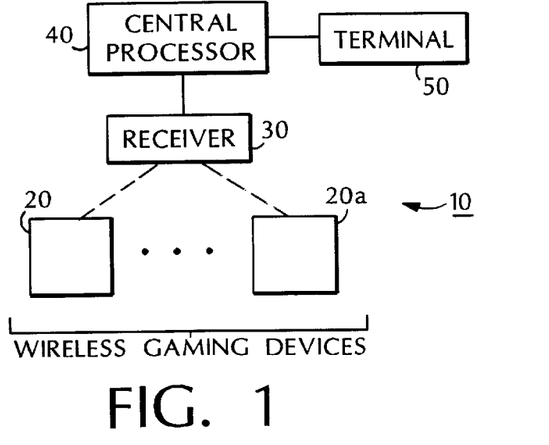
FIG. 1 is a diagrammatic sketch of an interactive gaming system of the present invention.

As shown in FIG. 1, a wireless interactive gaming system 10 includes one or more wireless gaming devices 20 ... 20a, a receiver 30, and a central processor 40. Wireless interactive gaming system 10 may also include a terminal 50 which is in communication with central processor 40.

In a gaming environment that employs system 10, a player receives wireless gaming device 20 from a game officiant who represents a gaming establishment or the "house". Wireless gaming device 20 is capable of receiving wager information as commands entered by the player and transmitting the received wager information along with identification information to receiver 30 by wireless transmission.

System 10 preferably supports up to 20 or more wireless gaming devices within one gaming establishment. The range for the wireless transmission from wireless gaming device 20 should be up to 100 feet. The system should also operate with a 99% success rate without having to reenter any commands on wireless gaming device 20, and the response time should be less than 750 ms between entry of the command to transmission by the device. Wireless gaming device 20 should also be able to share the gaming environment with other remote control devices and should tolerate typical ambient light conditions, including indirect sunlight and light emitted by video game machines.

Figure 2:
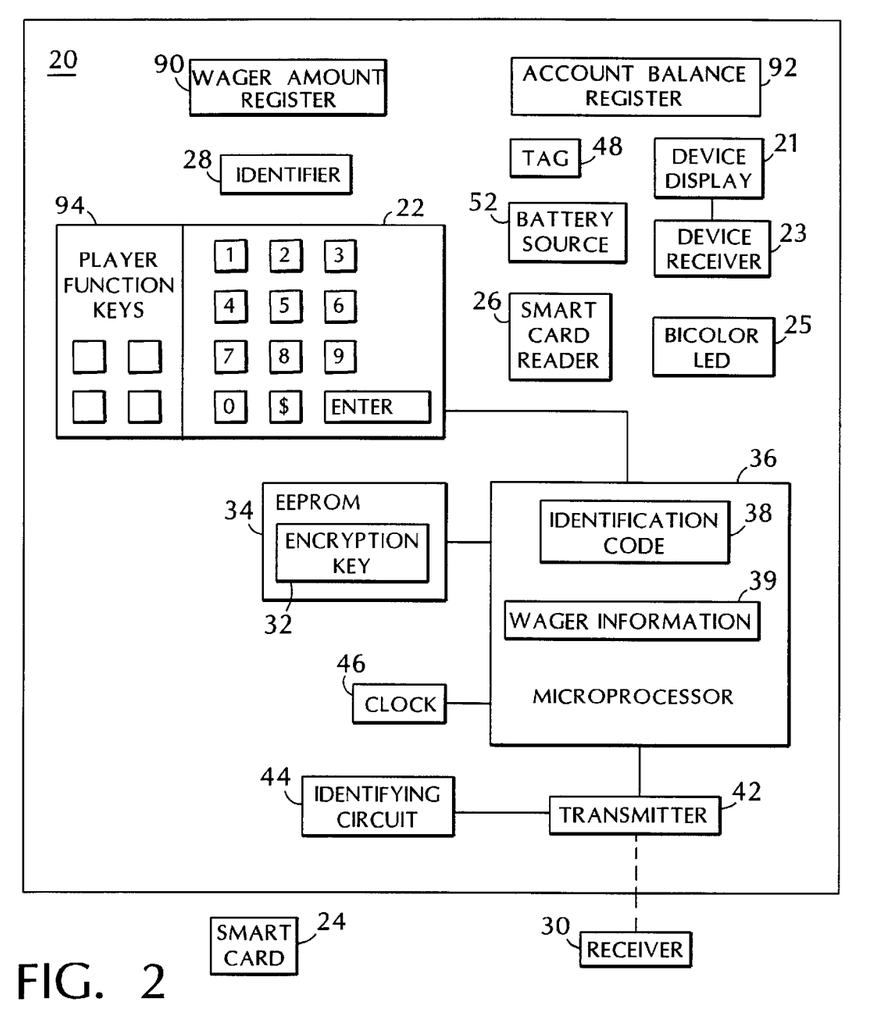
FIG. 2 is a diagrammatic sketch of the wireless gaming device of the present invention.

FIG. 2 shows the components of wireless gaming device 20. Device 20 may be any size apparatus that includes these components. Device 20 is preferably a hand-held device that can be carried by a player throughout the gaming establishment, and may also be ergonomically designed for the player's comfort. Device 20 is preferably sufficiently robust to withstand ordinary casino environment stresses, i.e., the device is impact, water and tamper resistant.

A player inputs information into wireless gaming device 20, e.g., by pressing push buttons or keys 22 on device 20. Device 20 may include any number, e.g. from 5 to 20, of buttons 22 in a keypad-type arrangement. Buttons 22 may be marked with the digits 0 through 9 and may also include a "$" (dollar sign) key and an "enter" key, so that the player may easily input wager information. Preferably, device 20 includes at least eight player selection buttons (e.g., digits) and at least five special function buttons, (e.g., to request the player's balance). Alternately, the player can input some or all of the wager information into device 20 by swiping a smart card 24, which contains a microprocessor chip or a magnetic stripe with encoded information, through a smart card reader 26 on device 20.

Wireless gaming device 20 may include an identifier 28. Identifier 28 may be, e.g., a series of alphanumeric characters, a bar code, or a magnetic stripe affixed to device 20. Alternately, identifier 28 may be a digital code stored in a secure memory, e.g., an electronically erasable programmable read only memory (EEPROM) 34. Identifier 28 is thus readable directly by the game officiant if it is a series of alphanumeric characters, or it may be read automatically by a bar code reader 56 or a magnetic stripe reader 58. Alternatively, identifier 28 may be programmed in EEPROM 34 or read from EEPROM 34 through an RS-232 port 84, which may be directly connected to encoder and decoder circuitry 82 in terminal 50 (FIG. 6).

Wireless gaming device 20 may store an encryption key 32. Encryption key 32 is used to encrypt information that is transmitted to receiver 30 from device 20. Encryption of the information transmitted to receiver 30 limits tampering with device 20 and prevents unauthorized or counterfeit devices from being used with system 10.

Encryption key 32 is preferably stored in EEPROM 34. EEPROM 34 has the advantage of being a memory device which is difficult to access if the appropriate encoding circuitry is not available. Thus, it is contemplated that the encoding circuitry that downloads encryption key 32 into device 20 will be securely held by the game officiant.

Figure 6:
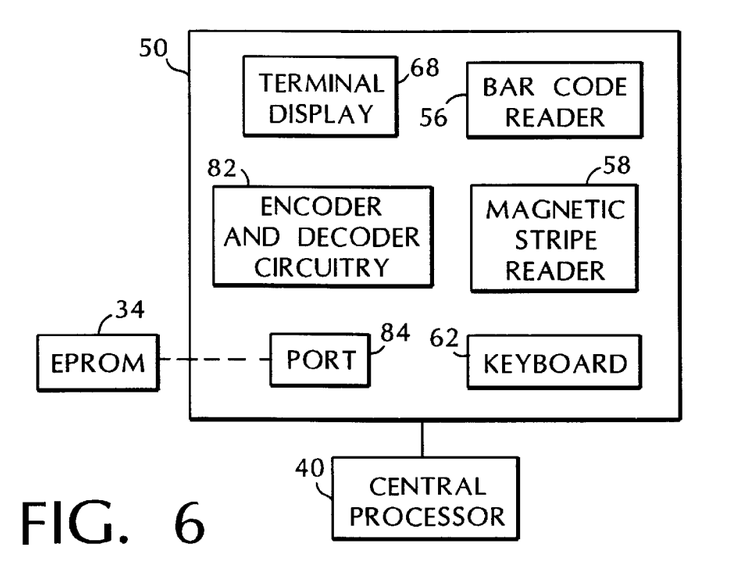
FIG. 6 is a diagrammatic sketch of the terminal of the present invention.

Alternately, encryption key 32 stored in EEPROM 34 may be updated and changed for each player who receives wireless gaming device 20 by directly connecting device 20 to encoding and decoding circuitry 82 in terminal 50 through port 84 at the time device 20 is delivered to the player (FIG. 6). Moreover, other digital information related to the game being played may be downloaded from terminal 50 to EEPROM 34 through the direct connection with device 20.

A microprocessor 36 controls the operation of wireless gaming device 20. Microprocessor 36 receives digital wager information 39 entered by the player using buttons or keys 22. Microprocessor 32 stores an identification code 38 associated with device 20 that is a digital equivalent of identifier 28. Microprocessor 32 also executes software applications for encrypting identification code 38 and the player's wager information 39 for transmission to receiver 30. The software contains an algorithm that encrypts a data packet including identification code 38 and wager information 39 using encryption key 32.

Wireless gaming device 20 preferably has a unique address, i.e. identification code, for communications with receiver 30 and stores a player identification that is programmed into the device by the central processor 40. Wireless gaming device 20 preferably includes a wager amount register 90, which is maintained and updated using the keys on the device. The value stored in wager amount register 90 may be included in transmissions from the device to central processor 40. The value of wager amount register 90 should default to a predetermined value, e.g. $1, when the device is initialized, and can be further adjusted by the player. Wireless gaming device 20 also preferably includes an account balance register 92, which is maintained in the device and is updated by central processor 40 periodically. The value of account balance register 92 should default to $0 when the device is initialized.

Wireless gaming device 20 preferably includes player function keys 94. Player function keys 94 may be used to accomplish the following functions:

1. Transmit a message to receiver 30;
2. Request account balance information;
3. Adjust the state of the device;
4. Affect the data to be sent in the next transmitted message;
5. Increment the wager amount register by a predetermined amount, e.g., $10, $5 or $1;
6. Reset the wager amount register to the default value, e.g., $1.

The firmware of wireless gaming device 20 should only allow for one press of buttons or keys 22 every 100 ms. Key presses should not be queued; thus, when a key press message is queued to be sent, no other player input should be accepted until the queued message has been sent.

Wireless gaming device 20 includes a transmitter 42. Transmitter 42 receives encrypted digital information from microprocessor 36 and converts it to a signal for wireless transmission to receiver 30. Transmitter 42 transmits signals wirelessly, e.g., using radio frequency signals or infrared signals. Communications between receiver 30 and wireless gaming device 20 may be asynchronous at 2400 bits per second. Various techniques for such cordless transmission of signals are known.

Wireless gaming device 20 may include an identifying circuit 44 that drives transmitter 42 to periodically send an identification signal to receiver 30. The use of identifying circuit 44 permits receiver 30 and central processor 40 to be assured that device 20 is still active, functioning and present in the gaming establishment. Thus, if device 20 were removed from the gaming establishment, receiver 30 and central processor 40 would no longer receive and detect the periodic identification signal sent by identifying circuit 44 and transmitter 42, and the game officiant may be alerted that device 20 has been removed from the gaming establishment.

Wireless gaming device 20 may contain a real-time clock 46 that permits microprocessor 36 to monitor the current time and date. Clock 46 may consist of a timing circuit. Microprocessor 36 can use the time and date information obtained from clock 46 to perform calculations and other functions based on the current time and date.

Wireless gaming device 20 may also include a tag 48, such as an electronic or magnetic component, which activates an alarm when passed through a sensing apparatus located at the entrance and/or exit of the gaming establishment. Activation of the alarm by passing device 20 with tag 48 through the sensing apparatus notifies the game officiant of an attempted removal of device 20 from the gaming establishment.

Wireless gaming device 20 may be powered by a battery source 52 contained within device 20. A portable power source such as battery source 52 permits extended cordless operation of device 20 throughout a gaming environment. Battery source 52 may be part of a removable, rechargeable battery pack that allows device 20 to be recharged when it is not in use.

In one embodiment, wireless gaming device 20 displays information such as game information on a device display 21, such as a liquid crystal display (LCD) with a back-light. The LCD can be used to display the values stored in wager amount register 90 and account balance register 92. Device 20 may include a display receiver 23 which receives digital information transmitted from receiver 30 or from central processor 40.

Device 20 may also include a bicolor light emitting diode (LED) 25. Bicolor LED 25 is capable of displaying at least two colors, e.g., red and green. The green light may flash each time wireless gaming device 20 sends a transmission to receiver 30, for a period of time to ensure that it is visible to the player. The red light may illuminate when a key is pressed on wireless gaming device 20, and remain lit until the transmission is received by receiver 30; no additional key entry will be enabled when the red light is lit. Device 20 may also include additional light emitting diodes (not shown), for example to indicate when account balance register 92 is being updated and the balance information is being displayed on the LCD.

Figure 3:
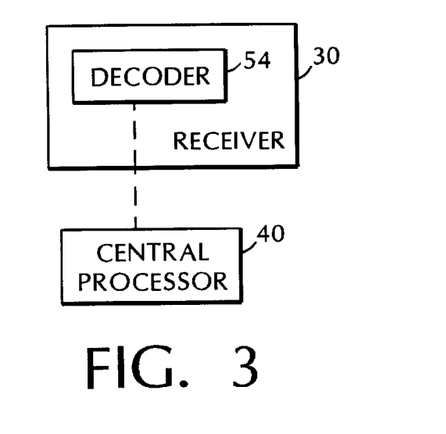
FIG. 3 is a diagrammatic sketch of the receiver of the present invention.

Receiver 30 is capable of receiving signals transmitted from transmitter 42 in device 20. As shown in FIG. 3, receiver 30 contains a decoder 54, which converts the received signals, e.g., into digital information. This digital information contains at least identification code 38 and the player's wager information 39. Receiver 30 sends the digital information obtained by decoder 54 to central processor 40. Communications between central processor 40 and receiver 30 may be by an RS-232 electrical interface data serial communications link, with communications being asynchronous at either 9600 or 19,200 bytes per second.

Receiver 30 can receive signals from many wireless devices either simultaneously or in rapid succession, e.g., using multiplexing techniques, so that many players can place wagers using their wireless gaming devices 20 during a short time interval. Receiver 30 differentiates signals received from the various devices by the identification codes which are present in the signals received by receiver 30.

Figure 4:
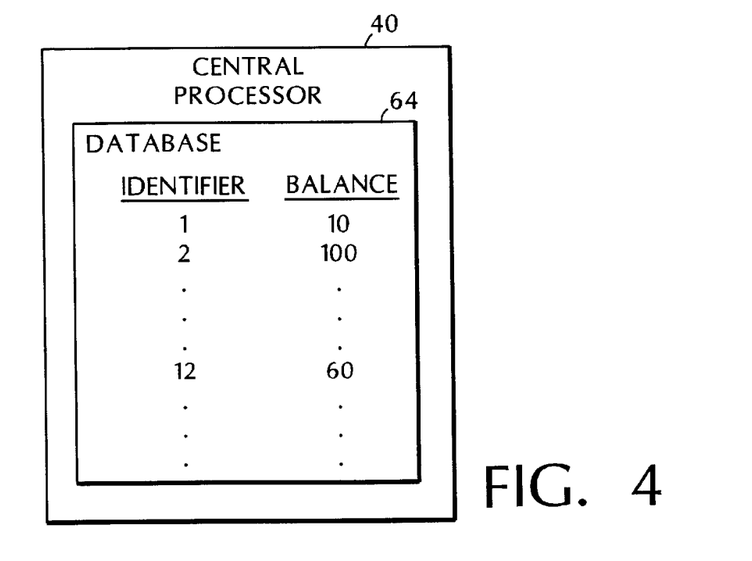
FIG. 4 is a diagrammatic sketch of the central processor of the present invention.

Central processor 40 receives identification code 38 and the player's wager information 39 from receiver 30. Central processor 40 also decrypts this information using encryption key 32. Central processor 40 is capable of receiving data from multiple wireless gaming devices in an apparently simultaneous manner.

As shown in FIG. 4, an account for the player is stored in a database 64 of central processor 40. Database 64 stores the monetary value of the balance of the account associated with identifier 28 of wireless gaming device 20.

Central processor 40 manages the player's account in database 64 based on signals received from the player's wireless gaming device 20 as the player places wagers and when prizes are awarded during play of the game. Central processor 40 subtracts money from the player's account balance when the player places a wager. The player's account balance may be automatically increased by central processor 40 when the player wins a game on which he has placed a wager.

Central processor 40 also stores and is capable of executing software applications containing algorithms to calculate players' account balances, wagers, and winnings. Central processor 40 should be able to execute all of the algorithms which define the actions performed on the players' accounts during the progress of the game, as wagers are entered, as winnings paid out, and when funds are added to the players' accounts.

Algorithms in the software in central processor 40 may also calculate odds and payouts for certain games, such as lottery-type games, during play of the game. The odds and payouts at a particular point in time may depend on the characteristics of the game being conducted by central processor 40, and may change as the game progresses. These algorithms may be executed by central processor 40 to provide exact calculations of the odds of specific game events occurring and the associated prizes for a player's correctly predicting the occurrence of one of those events. The algorithms may be executed continuously, so that real-time odds and payout can be calculated as the game progresses.

Figure 5:
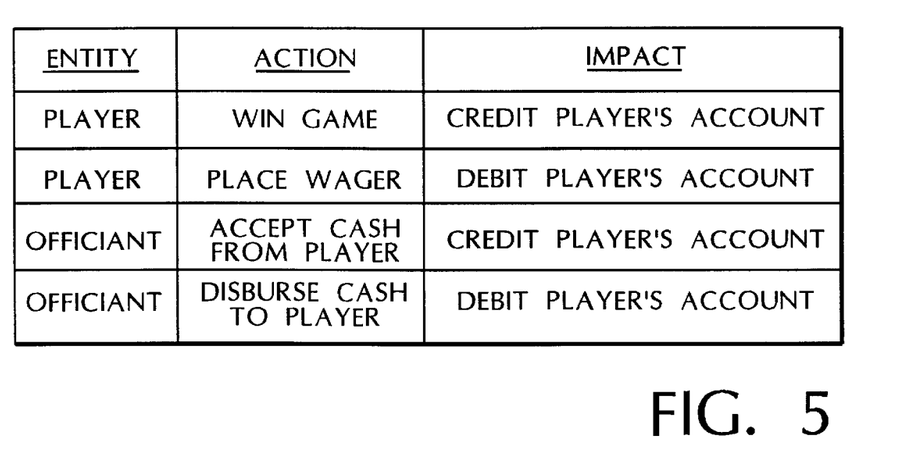
FIG. 5 is a chart showing the impact of various wagering activities on a player's account.

FIG. 5 shows the actions that may be performed on players' accounts by central processor 40, and their impact on the accounts. For example, if the player wins a game, his account is credited for the payout based on his wager. If the player places a wager using wireless gaming device 20, his account is debited by the amount of the wager. If the game officiant receives additional funds from the player, the balance of the player's account is credited by the amount of the funds. If the game officiant closes the player's account and disburses funds to him, the balance of the player's account is debited by the amount disbursed.

Central processor 40 may be located in the gaming establishment that houses receiver 30. Alternately, central processor 40 may be located remotely from receiver 30, communicating with receiver 30 via electronic digital telephone communication or wireless transmission, such as a serial communication link. Additionally, central processor 40 may perform a multitude of functions for various receivers in a variety of gaming environments.

In one embodiment, communication among central processor 40, receiver 30, and wireless gaming device 20 involves a polling scheme. Polling enables many wireless gaming devices to communicate with a receiver without interference between them. Such a polling scheme may include the transmission of digital signals in the form of strings of hexadecimal characters. Preferably, all communications between central processor 40, receiver 30 and wireless gaming device 20 are encrypted.

In such a polling scheme, hexadecimal characters may be reserved for specific control protocols. For example, an attention character is a header character used to begin all transmissions from central processor 40 to receiver 30, and serves to delineate messages and synchronize the receipt of messages in the receiver. The same function is implied when the attention character follows in response to a message transmission. An acknowledgement character is another header character which provides acknowledgement to the transmitting device that the previous message's data has been received and verified. The acknowledgement character can also function as an attention character to begin a subsequent message. An end of message character is used to indicate the end of a transmission. Also, a complement next byte character allows for use of reserved protocol characters within a normal transmission message by avoiding a false control signal when a message data byte matches one of the control characters. When a message byte that needs to be sent matches one of the protocol control characters, the complement next byte character is sent, followed by the one's complement of the matching message byte.

Verification of received data may be accomplished using a single byte checksum of the message information. This checksum may be the one's complement of the sum of the original message data, not including the header character. If the checksum results in a value equal to one of the protocol control characters, it will be treated in accordance with the function of the complement next byte character.

Figure 11A:
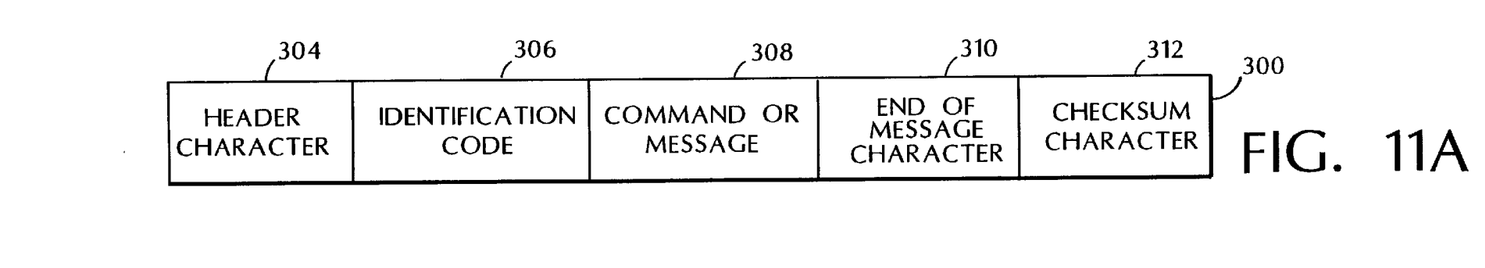
FIGS. 11A and 11B are diagrams showing the format of character strings for messages sent by the central processor and the wireless gaming device, respectively.

In the polling scheme described above, there are three different modes of communication over the link between central processor 40 and receiver 30. First, central processor 40 may send messages intended for receiver 30. Second, central processor 40 may send messages intended for wireless gaming device 20. Third, wireless gaming device 20 may send messages intended for central processor 40. As shown in FIG. 11A, messages sent by central processor 40 may be in the form of a character string 300 formatted with a header character 304, followed by the identification code of the intended device 306, the command or message 308, an end of message character 310, and a checksum character 312. Messages received by receiver 30 or wireless gaming device 20 may be acknowledged by transmission of an acknowledgement character, but central processor 40 need not acknowledge messages sent from the wireless gaming devices. Messages sent by the central processor to be received by wireless gaming device 20 may be broadcast to all of the wireless gaming devices. A device address may be reserved as a broadcast address for all of the wireless gaming devices, and all devices will receive messages sent to this address; in this case, no acknowledgement need be returned from any of the wireless gaming devices.

Each command or message may begin with a command code to signal how the information contained in the message is to be used. Command codes for messages sent by central processor 40 to receiver 30 and wireless gaming device 20 include the following:

1. Send a device address list to the receiver;
2. Send account balance information to the addressed device;
3. Send command to disable the addressed device;
4. Send command to enable the addressed device.

Figure 11B:
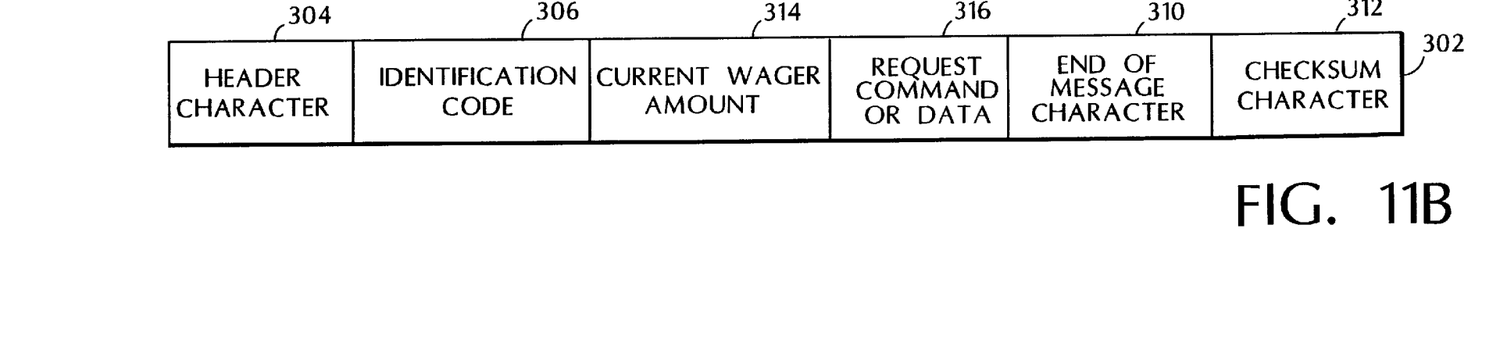

As shown in FIG. 11B, messages sent between receiver 30 and wireless gaming device 20 may be in the form of a character string 302 formatted with a header character 304, followed by the identification code of the intended device 306, the current wager amount 314, the request, command or data 316, an end of message character 310, and a checksum character 312. Command codes for requests, commands and data sent between receiver 30 and wireless gaming device 20 include the following:

1. Read user identification;
2. Read device address;
3. Read balance register;
4. Read wager amount register;
5. Provide device status;
6. Write user identification;
7. Write device address;
8. Write balance register;
9. Write wager amount;
10. Perform self test.

These command codes may be used to program the device addresses and user identification information into the wireless gaming devices, as well as to initialize the device to the default state, i.e., the player's account balance of $0. The account balance register and the user identification may each comprise two characters, the least significant byte and the most significant byte, allowing for the use a greater range of numbers for these values.

Figure 12:
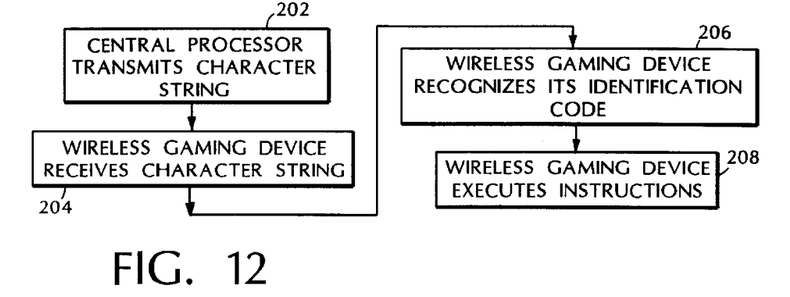
FIG. 12 is a flow chart showing how the central processor communicates with the wireless gaming device.

FIG. 12 shows how central processor 40 communicates with wireless gaming device 20. Central processor 40 transmits a string of hexadecimal characters (step 202), including, e.g., a header character, followed by the device's identification code, followed by a request, command or data, followed by an end of message character, followed by a checksum character. After central processor 40 transmits the character string, wireless gaming device 20 receives the string (step 204), recognizes its identification code (step 206), and executes any instructions in the string (step 208). When central processor 40 sends an instruction to all wireless gaming devices simultaneously, all currently active devices receive and execute the instruction. Wireless gaming device 20 does not send an acknowledgement message to central processor 40, although receiver 30 may receive a transmission from device 20 that the instruction was received properly. Central processor 40 also communicates with receiver 30 in a similar manner, except that receiver 30 may send an acknowledgement message to central processor 40 which includes the acknowledgement control protocol character.

Similarly, wireless gaming device 20 communicates with receiver 30 and central processor 40 using, e.g., hexadecimal character strings. Receiver 30 regularly and periodically polls the active wireless gaming device 20 for information requests or wagering requests. If the player has entered a request into device 20 since the last time device 20 was polled, then the player's request will be transmitted to receiver 30.

Figure 13:
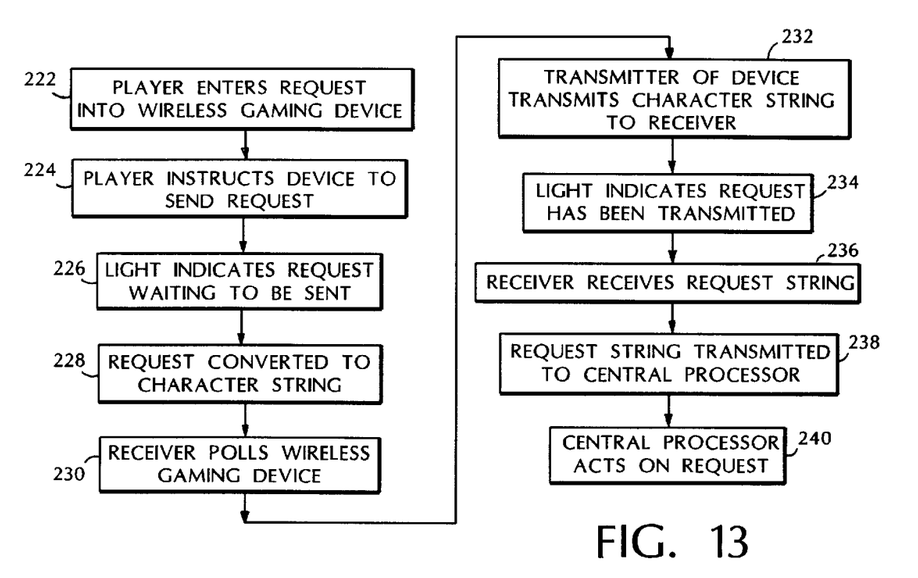
FIG. 13 is a flow chart showing how the wireless gaming device receives and relays player requests to the central processor.

FIG. 13 shows how wireless gaming device 20 receives and relays player requests to central processor 40. First, the player enters a request into device 20 using buttons or keys 22 (step 222). The player then presses a button labeled, e.g., "enter" or "send," instructing device 20 to send the request the next time receiver 30 polls device 20 (step 224). When this button has been pressed, the red light of bicolor LED 25 is illuminated (step 226), thereby informing the player that the request is waiting to be sent. The request is converted into a hexadecimal character string (step 228), including, e.g., a header character, an identification code (or, alternatively, a separate identification string reserved for a specific player), the current wager amount, the player's request (e.g., to change the wager amount or to send a balance update), an end of message character, and a checksum character. The next time receiver 30 polls device 20 (step 230), the transmitter of device 20 transmits the character string to receiver 30 (step 232). When device 20 is polled by receiver 30, the green light of bicolor LED 25 flashes (step 234), informing the player that the request has been transmitted. Receiver 30 receives the request string (step 236), and transmits the string to central processor (step 238). Central processor then acts on the player's request (step 240).

Using terminal 50, the game officiant may process wagering transactions and distribute wireless gaming devices such as wireless gaming device 20. As shown in FIG. 6, terminal 50 may include a bar code reader 56 and/or a magnetic stripe reader 58 for rapid entry of the identifier 28 of device 20 prior to delivering device 20 to the player. Reading devices 56 and 58 provides information in the form of digital data to terminal 50. Terminal 50 includes a keyboard 62 by which the game officiant can manually enter data to be sent to central processor 40. Using either reading device 56 or 58, keyboard 62, or a combination of these, the game officiant communicates with central processor 40 to establish a player's account, increase the balance of the account when the player tenders funds to the game officiant, and decrease the balance of the account when the player seeks to collect the cash value of his account balance.

The player establishes a balance of the account associated with his wireless gaming device 20, identified by identifier 28, when he receives device 20 from the game officiant. The player may increase the monetary value of the balance of the account by paying additional funds, in the form of cash or credit, to the game officiant, who accesses the account stored in central processor 40 through terminal 50 to increase the balance of the account.

Device 20 is returned to the game officiant after the player has played one or more games. Readers 56 and 58 may be used to read identifier 28 for closing out the player's account stored in database 64 of central processor 40. Terminal 50 includes a terminal display 68 which notifies the game officiant of the balance of the player's account, so that the player may be paid the cash value of the remaining balance of his account.

Figure 7:
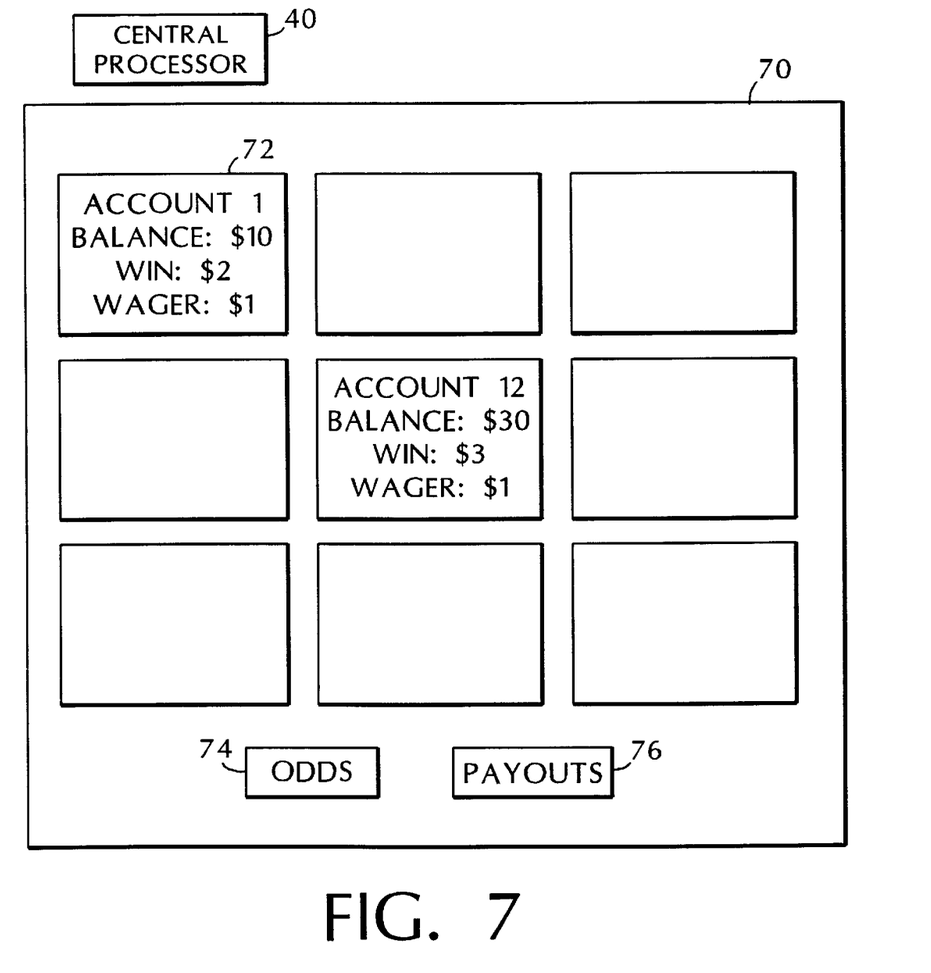
FIG. 7 is a somewhat diagrammatic view of an account balance display of the present invention.

In one embodiment, an account status display device 70 is located in the gaming establishment to display players' account information. As shown in FIG. 7, display device 70 may be, e.g., a liquid crystal display or a cathode ray tube display. Display device 70 is controlled by central processor 40, which sends information to display device 70 for display to the players.

A player may look at display device 70 to confirm that wagers transmitted from wireless gaming device 20 were received by receiver 30 and sent to central processor 40, to determine the monetary balance of the player's account, and to verify that the player's winnings have been credited to his account. Display device 70 displays key information necessary for a player to participate in a game. The information displayed for each player may include the account number (which corresponds to identifier 28), the player's account balance, the player's last wager, and the player's last prize award or win.

Display device 70 is divided into specific areas, e.g., display area 72, each area showing the account information for one player. The size of display area 72 may be determined by the size of display device 70 and the number of players who possess wireless display devices. It is contemplated that only active accounts will be displayed on display device 70. If additional display devices are required to display the information concerning a large number of accounts, central processor 40 may be configured to drive multiple similar display devices.

Display device 70 may also be used to display the odds 74 and payouts 76 for game wagers. Alternately, a separate display device driven by central processor 40 may be used to display the odds 74 and payout 76 information. Further, the odds 74 and payouts 76 may be displayed on device display 21 (FIG. 2).

Figure 8:
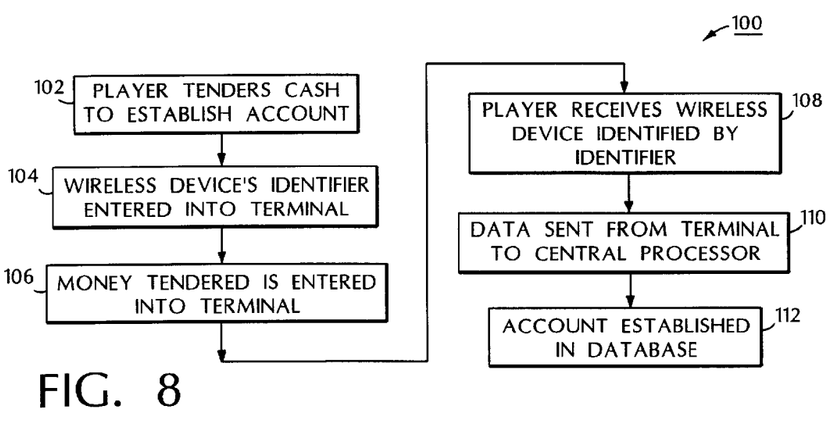
FIG. 8 is a flow chart showing how a player establishes an account to play a game with a wireless gaming device.
Figure 9:
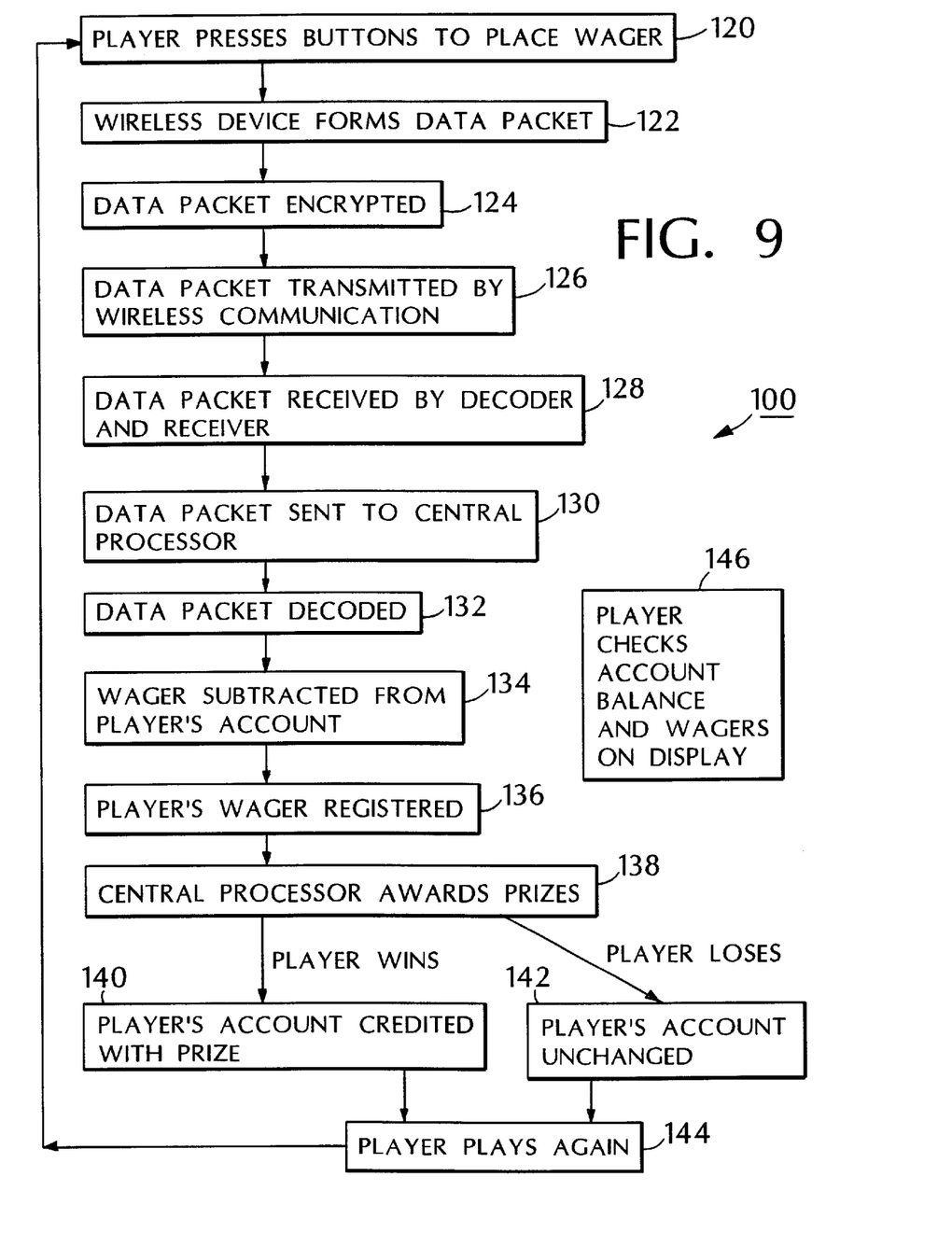
FIG. 9 is a flow chart showing how a player places a wager using a wireless gaming device.
Figure 10:
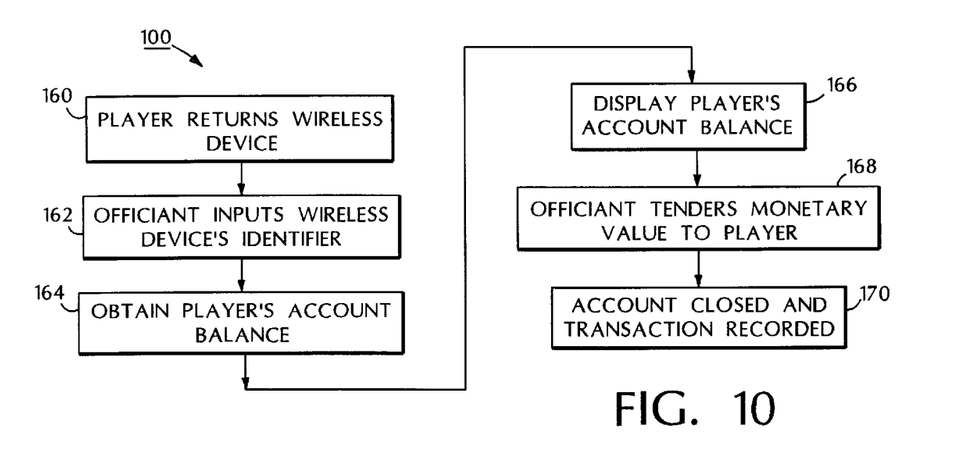
FIG. 10 is a flow chart showing how a player closes an account associated with a wireless gaming device.

FIGS. 8 through 10 show an exemplary procedure 100 for using wireless interactive gaming system 10. As seen in FIG. 8, a player tenders money in the form of cash or credit, e.g., $100, to a game officiant in the gaming establishment to establish an account (step 102). The game officiant chooses a wireless gaming device 20 and uses, e.g., bar code reader 56 on terminal 50 to enter identifier 28 into terminal 50 (step 104). The game officiant also inputs the amount of money tendered, i.e. $100, into terminal 50 via keyboard 62 (step 106). The game officiant hands wireless gaming device 20 to the player and tells the player that his account is, e.g., Account No. 12 (step 108). Alternately, the player may identify his account number directly from identifier 28 on device 20. The information entered by the game officiant into terminal 50 is sent to central processor 40 (step 110), which establishes an account record for the player in database 64 (step 112).

For this example, central processor 40 may be conducting a racing game in which players choose a winning racing element on which to place a wager for the next racing game to be displayed in the gaming establishment. To place a wager, the player presses buttons 22 on wireless gaming device 20 (step 120), as shown in FIG. 9.

In one embodiment, the player first presses the button that corresponds to the number assigned to the racing element that he chooses, e.g., "3", and then the wager amount, e.g., "$" and "5", for a $5 wager. The player then presses the "enter" key to transmit his wager to central processor 40.

In an alternate embodiment, the game may be simplified so that all wagers are placed for a fixed amount, e.g., $1, by pressing a single button on wireless gaming device 20. By pressing the button that corresponds to the number assigned to the chosen racing element, e.g., "3", the player places a $1 bet on racing element number 3. The player can then place a larger wager on racing element number 3, by pressing the "3" button the number of times corresponding to the number of $1 bets he desires to make, e.g., by pressing "3" five times to wager $5 on racing element number 3.

Each time the player enters a wager, wireless gaming device 20 forms a data packet containing the player's wager information 39 and identification code 38 of device 20 (step 122). The data packet is encrypted (step 124) and transmitted by transmitter 42 via wireless communication (step 126).

Decoder 54 in receiver 30 receives the encrypted data packet transmitted by transmitter 42 (step 128). The encrypted data packet is sent to central processor 40 (step 130), where it is decrypted (step 132). Central processor 40 uses the information it has obtains to update the player's account in database 64 by subtracting the wagered amount from the player's account balance (step 134) and registers the player's wager on the game (step 136).

After the game has been played, central processor 40 awards prizes to winning players based on the wagers they have made and the odds associated with the winning outcome of the game (step 138). If the player in possession of wireless gaming device 20 is a winner, central computer 40 updates the player's account in database 64 by adding the monetary amount of the prize to the player's account balance (step 140). Otherwise, the player's account remains unchanged (step 142).

The player may repeat steps 120–142 to place wagers on subsequent games played in the gaming establishment (step 144). Moreover, the player may check on his account balance and the amount of his wagers by referring to display device 70 or device display 21 (step 146).

As shown in FIG. 10, when the player has finished playing games in the gaming establishment, he returns wireless gaming device 20 to the game officiant (step 160). The game officiant again inputs identifier 28 into terminal 50, e.g., by using bar code reader 56 (step 162). Terminal 50 accesses the player's account information stored in database 64 of central processor 40 to obtain the player's remaining account balance (step 164). Terminal display 68 displays the player's remaining account balance to the game officiant (step 166), who then tenders the monetary value of that amount to the player (step 168). The account is closed, and the transaction is recorded in central processor 40 (step 170).

Other embodiments are within the scope of the following claims.

What is claimed is:

1. A system for playing a wagering game, comprising:
   a wireless gaming device comprising an identification code, entry apparatus for entering wagering information by a player, and a transmitter;
   a receiver for receiving the identification code and the wagering information transmitted by the transmitter of the wireless gaming device, the receiver polling the wireless gaming device to determine whether the player has entered wagering information to be transmitted to the receiver.

2. The system of claim 1 wherein the receiver periodically polls the wireless gaming device.

3. The system of claim 1 wherein the wagering information relates to a wager request.

4. The system of claim 1 wherein the wagering information includes a command.

5. The system of claim 1 wherein the wagering information includes data.

6. The system of claim 1 wherein the wagering information comprises a string of characters.

7. The system of claim 6 wherein the characters are hexademical digits.

8. The system of claim 1 wherein the wireless gaming device is a hand-held device.

9. The system of claim 1 wherein the entry apparatus comprises keys.

10. The system of claim 1 wherein the entry apparatus comprises a smart card reader.

11. The system of claim 1 wherein the wireless gaming device further comprises a wager amount register.

12. The system of claim 1 wherein the wireless gaming device further comprises an account balance register.

13. The system of claim 1 wherein the wireless gaming device further comprises a liquid crystal display.

14. The system of claim 1 wherein the wireless gaming device further comprises a bicolor light emitting diode to indicate separately that the wagering information has been entered by the player and that the wagering information has been transmitted by the transmitter.

15. The system of claim 1 wherein the transmission is by radio frequency signals.

16. The system of claim 1 wherein the transmission is by infrared signals.

17. The system of claim 1 further comprising
   a processor in communication with the receiver for processing the wagering information transmitted by the wireless gaming device based on the identification code.

18. The system of claim 17 wherein the processor further comprises a database for storing an account of the player.

19. The system of claim 1 wherein the wireless gaming device further comprises an electronically programmable read only memory for storing an identifier corresponding to the identification code.

20. The system of claim 1 further comprising an encryption key to encrypt the identification code and the wagering information prior to transmission and to decrypt the identification code and the wagering information after being received by the receiver.

21. A method of playing a wagering game using a wireless gaming device, comprising:
   providing the wireless gaming device comprising an identification code, entry apparatus for entering wagering information by a player, and a transmitter;
   entering the wagering information into the entry apparatus;
   polling the wireless gaming device to determine whether the player has entered wagering information to be transmitted by the transmitter; and
   transmitting the identification code and the wagering information.

22. The method of claim 21 wherein the wireless gaming device is polled periodically.

23. The method of claim 21 further comprising
   displaying the wagering information on the wireless gaming device.

24. The method of claim 21 wherein the identification code and the wagering information are transmitted by radio frequency signals.

25. The method of claim 21 wherein the identification code and the wagering information are transmitted by infrared signals.

26. The method of claim 21 further comprising
processing the wagering information transmitted by the wireless gaming device based on the identification code.

27. The method of claim 21 further comprising encrypting the identification code and the wagering information prior to transmission.

28. A wireless gaming device for transmitting wagering information to a receiver, comprising:
a memory for storing an identification code;
entry apparatus for entering the wagering information;
a transmitter for converting the identification code and the wagering information into a signal for wireless transmission to the receiver, the transmitter transmitting the signal when the receiver polls the wireless gaming device to determine that the wagering information has been entered.

29. The wireless gaming device of claim 28 wherein the wireless gaming device is periodically polled by the receiver.

30. The wireless gaming device of claim 28 wherein the identification code is stored in the memory in a digital format.

31. The wireless gaming device of claim 28 wherein the wireless gaming device is a hand-held device.

32. The wireless gaming device of claim 28 wherein the entry apparatus comprises keys.

33. The wireless gaming device of claim 28 wherein the entry apparatus comprises a smart card reader.

34. The wireless gaming device of claim 28 wherein the wireless transmission is by radio frequency signals.

35. The wireless gaming device of claim 28 wherein the wireless transmission is by infrared signals.

* * * * *

UNITED STATES PATENT AND TRADEMARK OFFICE
CERTIFICATE OF CORRECTION

PATENT NO.   : 6,702,672 B1
DATED        : March 9, 2004
INVENTOR(S)  : Angell et al.

It is certified that error appears in the above-identified patent and that said Letters Patent is hereby corrected as shown below:

Title page,
Item [63], Related U.S. Application, change "08/844,794" to -- 08/844,764 --.

Column 1,
Line 5, change "08/844,794" to -- 08/844,764 --.

Signed and Sealed this

Eleventh Day of January, 2005

JON W. DUDAS
*Director of the United States Patent and Trademark Office*